United States Patent

Chun et al.

Patent Number: 5,999,829
Date of Patent: Dec. 7, 1999

[54] CIRCUIT AND METHOD FOR CONTROLLING THE POWER USED BY A PORTABLE RADIOTELEPHONE

[75] Inventors: Jong-Ok Chun; Moon-Ki Huh, both of Seoul, Rep. of Korea

[73] Assignee: Samsung Electronics Co., Ltd., Rep. of Korea

[21] Appl. No.: 08/961,659

[22] Filed: Oct. 31, 1997

[30] Foreign Application Priority Data

Dec. 11, 1996 [KR] Rep. of Korea ......... 96 64385
Dec. 12, 1996 [KR] Rep. of Korea ......... 96 64868
Jul. 18, 1997 [KR] Rep. of Korea ......... 97 33501

[51] Int. Cl.$^6$ ....................... H04B 1/40
[52] U.S. Cl. ............ 455/572; 455/127; 455/552; 455/553
[58] Field of Search .......... 455/553, 552, 455/127, 116, 572, 115

[56] References Cited

U.S. PATENT DOCUMENTS

| | | | |
|---|---|---|---|
| 3,697,886 | 10/1972 | Conn et al. | 455/127 |
| 5,203,020 | 4/1993 | Sato et al. | 455/127 |
| 5,422,931 | 6/1995 | Austin-Lazarus | 455/553 |
| 5,423,078 | 6/1995 | Epperson et al. | 455/553 |
| 5,697,096 | 12/1997 | Aoki | 455/127 |
| 5,732,348 | 3/1998 | Norimatsu | 455/552 |
| 5,774,797 | 6/1998 | Kawano et al. | 455/115 |

*Primary Examiner*—Salvatore Cangialosi
*Attorney, Agent, or Firm*—Dilworth & Barrese

[57] ABSTRACT

A circuit and method for controlling the power associated with a power amplifier in a portable radiotelephone includes a power amplifier, a power supply, a power supply controller, connected between the power supply and the above power amplifier, for adjusting the voltage applied to the power amplifier, and a control unit, connected to the power supply controller, for controlling the adjusted voltage of the power supply controller according to the transmitting power required in a region of a strong or weak electric field, and/or required in a one of dual (FM/CDMA) modes.

21 Claims, 6 Drawing Sheets

CIRCUIT AND METHOD FOR CONTROLLING THE POWER USED BY A PORTABLE RADIOTELEPHONE

BACKGROUND OF THE INVENTION

1. Field of the Invention

The present invention relates to a power supply circuit for a portable radiotelephone and, more particularly, to a circuit and method for controlling the power used by a portable radiotelephone.

2. Description of the Related Art

In the field of mobile radio communications, it is possible to interlink two independent cellular radio systems having different operating bands in a method referred to as "dual band method." For instance, in the Republic of Korea (South Korea), it is necessary to interlink the existing CDMA (Code Division Multiple Access) method with the new PCS (Personal Communication System) method, in the U.S.A., to interlink the existing AMPS (Advanced Mobile Phone Service) method with the PCS method, and in Europe, to interlink the existing GSM (Groupe Speciale Mobile) method with the DCS (Digital Communication System) 1800 method.

A cellular mobile radio system which employs the CDMA method is a "digital system. " On the other hand, a cellular mobile radio system which employs a frequency modulation method (FM), such as AMPS, is an "analog system," i.e., speech signals are not digitally encoded prior to transmission on a radio frequency (RF) carrier. In practice, a digital cellular system may be used in dual mode together with an analog system, e.g., a dual mode cellular telephone system capable of being used in both the CDMA mode and the AMPS mode.

A portable (e.g., hand-held) radiotelephone (e.g., cellular phone) which is designed to operate in dual modes generally requires different radiating power levels for each of its modes. As such, each mode requires different battery power to operate. Conventional dual mode portable radiotelephones, however, are designed having power supplies (batteries) that generate power at levels to accommodate the mode requiring the most power to operate. As a result, unnecessary power is dissipated while the portable radiotelephone is operating in the mode which requires less power, which results in a shortened battery life.

Referring to FIG. 1, a diagram illustrating a power supply circuit of a conventional portable radiotelephone is shown. The power supply circuit of the conventional portable radiotelephone includes a power supply 10 ("battery"), a DC-to-DC Converter 20 connected to the output of battery 10, an inductor L1 connected to the output of the DC-to-DC converter, a pair of voltage dividing resistors R1 and R2, which are serially connected between the output of the DC-to-DC converter 20 and a ground, a power amplifier 30 and a linear regulator 31, which are connected to the output of the DC-to-DC converter 20, and a capacitor C1 connected between an input to the power amplifier 30 and ground.

The battery 10 is usually designed to supply more power than that needed by the power amplifier 30 and that needed to operate the ICs (not shown) of the conventional portable radiotelephone. Further, the power amplifier 30 and the ICs generally require different operating voltages. For example, the output voltage of the battery 10 is generally set at 7.2 V, whereas the voltage needed for the power amplifier 30 is 5 V, and the voltage needed for the ICs is 3.3 V. When 7.2 V is applied to DC-to-DC converter 20 from the battery 10, the DC-to-DC converter 20 converts the 7.2 V supplied by the battery 10 to a voltage of 5 V. Such voltage is then applied to the power amplifier 30 to amplify incoming signals and then transmit them through an antenna (not shown). The linear regulator 31 then changes the 5 V supplied from the DC-to-DC converter 20 to 3.3 V, which voltage is applied to operate the ICs.

The output voltage of the DC-to-DC converter 20 is determined by the voltage dividing resistors R1 and R2. In the conventional method, the resistance values of resistors R1 and R2 are preset so that the required 5 V is applied to the power amplifier 30.

In a dual mode portable radiotelephone employing both an FM mode and a CDMA mode, for example, the power amplifier 30 requires 4.7 V when operating in an FM mode, as opposed to 5 V when operating in a CDMA mode, which requires the linearity and saturation characteristics unlike the FM mode. Therefore, by utilizing the conventional power supply circuit of FIG. 1 in the dual mode portable radiotelephone, the 5 V required to power the power amplifier 30 in conformity with the CDMA mode is obtained, as demonstrated above, by presetting the resistance values of the voltage dividing resistors R1 and R2 so as to generate 5 V from the output of the DC-to-DC converter 20. However, because the resistance values remain constant regardless of the operating mode, 5 V is also generated in the FM mode (which only requires 4.7 V). Therefore, when operating in the FM mode, the conventional FM/CDMA dual mode portable radiotelephone unnecessarily wastes power, which results in shortening the battery life.

In addition to the different power requirements of dual mode portable radiotelephones, portable radiotelephones may also transmit signals at different power levels depending on the area in which they are operated. Specifically, the dual mode portable radiotelephone can effectively communicate with low power in a region exhibiting a strong electric field, i.e., in the proximity of a base station, but requires high power to communicate in a region exhibiting a weak electric field, i.e., in a remote place from the base station. In any event, dual mode portable radiotelephones are generally used in close proximity to the base station, i.e, a region of strong electric field. Therefore, on average, dual mode portable radiotelephones can operate with lower transmitting power levels.

In the conventional portable radiotelephone, however, the voltage applied to the power amplifier 30 for amplifying the transmission signals is set at 5 V in consideration of the situation where the portable radiotelephone is operating in a region of a weak electric, which requires higher transmission power levels to communicate effectively. Therefore, since the 5 V applied to the power amplifier remains constant even when the portable radiotelephone is operating in a region exhibiting a strong electric field (which requires less power), unnecessary power is dissipated resulting in shortening the battery life. Moreover, the temperature of the portable radiotelephone increases, which adversely affects the circuitry.

SUMMARY OF THE INVENTION

Accordingly, it is the object of the present invention to provide a circuit and method for controlling power used by a portable radiotelephone.

It is another object of the present invention to provide a circuit and method for controlling power of a dual mode portable radiotelephone by adjusting the power associated with a power amplifier in accordance with one of the dual modes.

It is yet another object of the present invention to provide a circuit and method for controlling power of a portable radiotelephone by adjusting power associated with a power amplifier in accordance with a required transmitting output level.

In one aspect of the present invention, a circuit for controlling power associated with a power amplifier in a portable radiotelephone having a first operating mode and a second operating mode, comprises: means for supplying power to the circuit; a power supply controller, responsive to the power supplying means and operatively coupled to the power amplifier, for adjusting said power supplied from the power supplying means and delivering the adjusted power to the power amplifier; and a control unit, operatively coupled to the power supply controller, for controlling the power adjustment provided by said power supply controller according to one of the first mode and second mode.

In another aspect of the present invention, a circuit for controlling power generated by a power amplifier in a portable radiotelephone, comprises: means for supplying power to said circuit; a power supply controller, responsive to the power supplying means and operatively coupled to the power amplifier, for adjusting the power supplied from the power supplying means and delivering the adjusted power to the power amplifier; and a control unit, operatively coupled to the power supply controller, for controlling the power adjustment provided by the power supply controller according to one of a strong electric field region and a weak electric field region.

In yet another aspect of the present invention, a circuit for controlling power associated with a power amplifier in a portable radiotelephone having a first operating mode and a second operating mode, comprises: means for supplying power to said circuit; a power supply controller, responsive to said power supplying means and operatively coupled to the power amplifier, for adjusting the power supplied from the power supplying means and delivering the adjusted power to the power amplifier; and a control unit, operatively coupled to the power supply controller, for controlling the adjusted power of the power supply controller according to one of the modes and electric field intensities in a region including a strong electric field region and a weak electric field region.

In still a further aspect of the present invention, a method for controlling power used by a portable radiotelephone having a first and second mode of operation and wherein said portable radiotelephone includes means for supplying power and a power amplifier, the method comprises the steps: selecting between the first or second mode of operation; providing a first mode setting signal for the selected first mode and providing a second mode setting signal for the selected second mode; controlling power supplied to the power amplifier in response to the first mode setting signal so as to supply necessary power for the first mode of operation; and controlling power supplied to the power amplifier in response to the second mode setting signal so as to supply necessary power for the second mode of operation.

In yet another aspect of the present invention, a method for controlling power used by a portable radiotelephone having a first and second mode of operation, and wherein said radiotelephone terminal includes means for supplying power and a power amplifier, the method comprises the steps: detecting a receiving electric field strength while the portable radiotelephone is operating; comparing the detected receiving electric field strength with a first reference strength; adjusting power supplied to the power amplifier when the detected receiving electric field strength is stronger than the first reference strength; and adjusting power supplied to the power amplifier when the detected receiving electric field strength is weaker than the first reference strength.

These and other objects, features and advantages of the present invention will become apparent from the following detailed description of illustrative embodiments thereof, which is to be read in connection with the accompanying drawings. It is to be understood that same or similar components illustrated throughout the figures are designated with the same reference numeral.

DETAILED DESCRIPTION OF PREFERRED EMBODIMENTS

It is to be understood that the following description describes a dual mode portable radiotelephone employing an FM mode as a first mode and a CDMA mode as a second mode for illustrative purposes only. The present invention can also be applied, at least, to any of the above-mentioned dual band methods.

Figure 1:
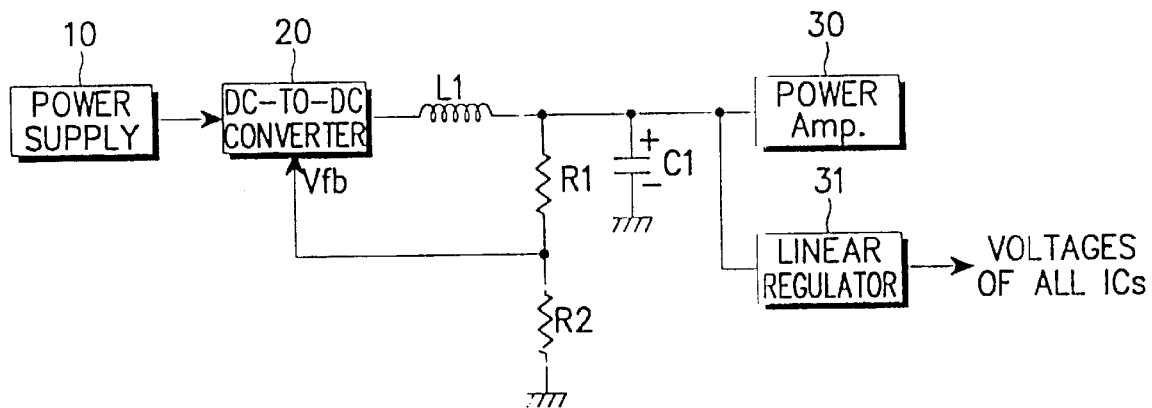
FIG. 1 is a circuit diagram illustrating a power supply circuit of a conventional portable radiotelephone.
Figure 2:
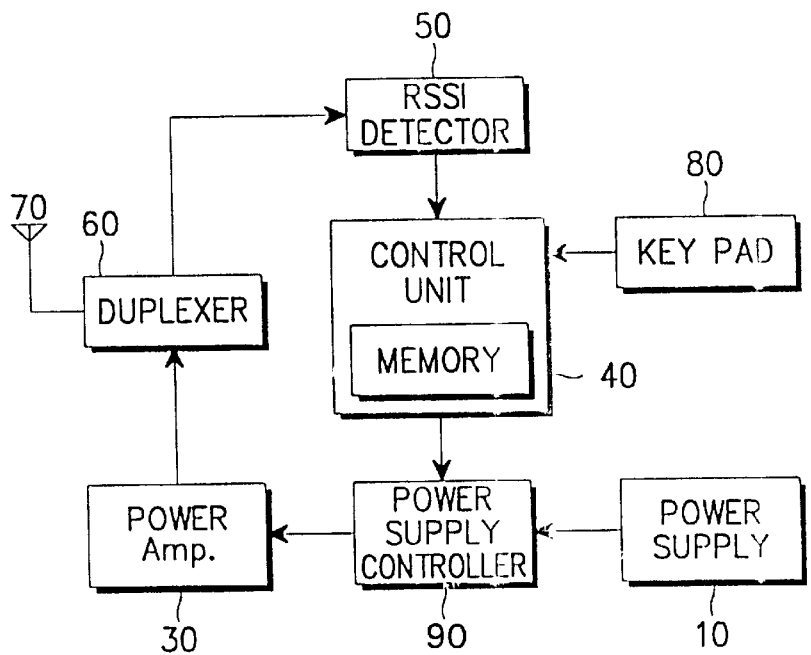
FIG. 2 is a block diagram illustrating an embodiment of a dual mode portable radiotelephone of the present invention.

Referring to FIG. 2, a block diagram of a dual mode portable radiotelephone according to an embodiment of the present invention is shown. The dual mode portable radiotelephone includes a control unit 40, operatively coupled to an RSSI detector 50, a power supply controller 90 and a keypad 80, to control the overall operations of the portable radiotelephone. The control unit 40 includes a memory having a ROM (not shown) for storing programs and data which control the overall operations of the portable radiotelephone, a RAM (not shown) to store data required to execute the programs, and an EEPROM (not shown) to permanently store telephone numbers and system parameters. The keypad 80 includes numerical keys (not shown) for dialing and function keys (not shown) for performing various functions, and provides the control unit 40 with information resulting from external key operations. A duplexer 60 transfers signals received from an antenna 70 to a receiving part (not shown) of the portable radiotelephone, and transfers signals received from a transmitting part (not shown) of the portable radiotelephone to the antenna 70. A receiving electric field strength (hereinafter referred to as "RSSI") detector 50, operatively coupled to the duplexer 60 and the control unit 40, detects the RSSI of an incoming signal transmitted by the duplexer 60 and then transmits a message to the control unit 40.

A battery 10 supplies power to ICs (not shown) and a power amplifier 30 via the power supply controller 90. The power supply controller 90 is responsive to signals from the control unit 40, and adjusts the power supplied to the power amplifier 30 according to such signals from the control unit 40. When receiving a transmitting signal from the transmitting part (not shown), the power amplifier 30 first amplifies the transmitting signal according to the power supplied by the power supply controller 90, and then transfers the amplified transmitting signal to the duplexer 60.

Figure 3:
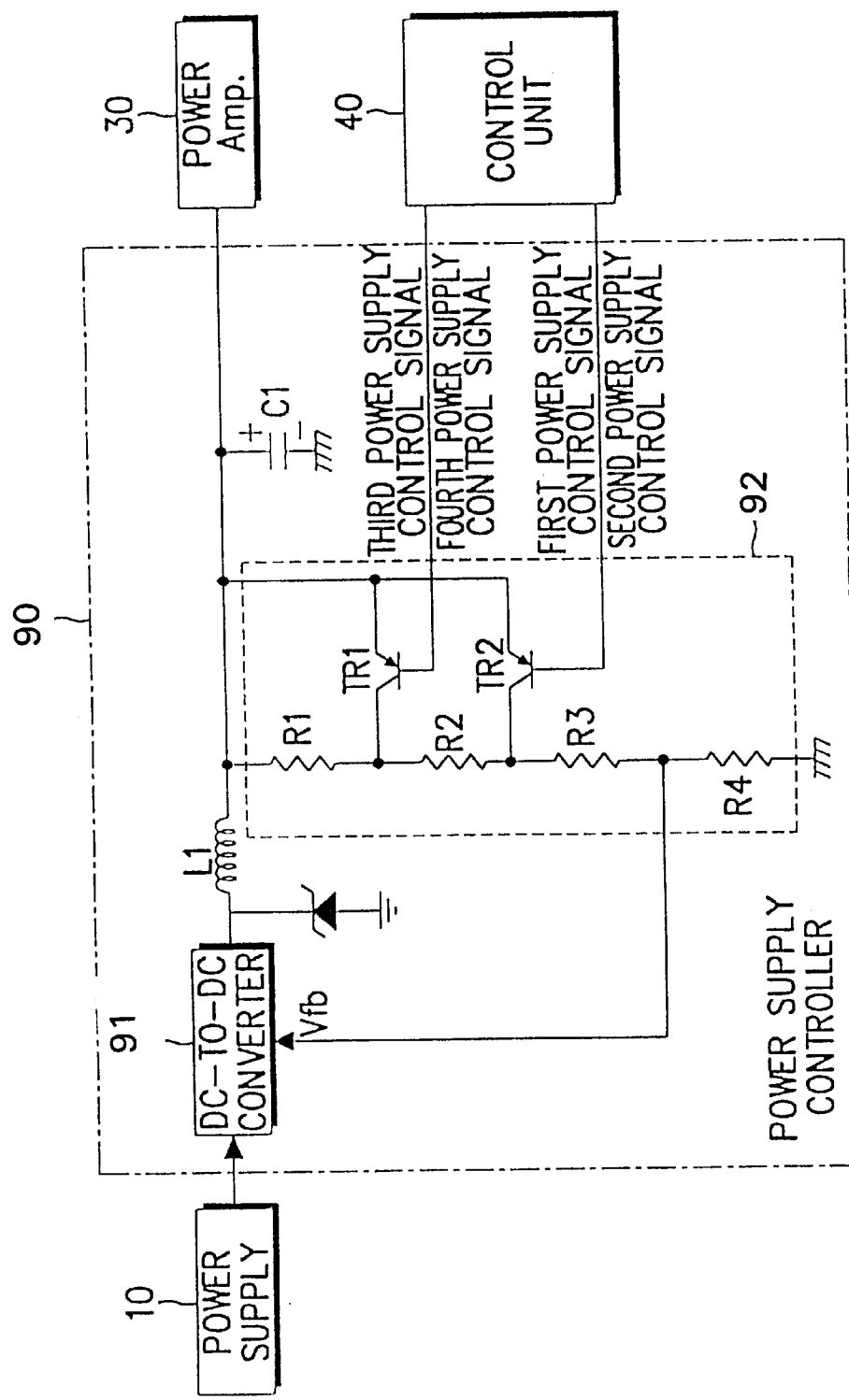
FIG. 3 is a circuit diagram illustrating a power supply controller as depicted in FIG. 2 according to an embodiment of the present invention.

Now referring to FIG. 3, a circuit diagram illustrating the power supply controller of FIG. 2 according to one embodiment of the present invention is shown. The power supply controller 90, under the control of the control unit 40, adjusts the power supplied from the battery 10 and delivers the adjusted power to the power amplifier 30.

The power supply controller 90 comprises a DC-to-DC converter 91; a converter output power controller 92 operatively coupled thereto; a zener diode Z1, serially connected between the output of the DC-to-DC converter 91, for regulating voltage; and an inductor L1, connected between the output terminal of the DC-to-DC converter 91 and the power amplifier, and a capacitor C1, connected between the output terminal of the DC-to-DC converter 91 and ground, for filtering AC signals. The DC-to-DC converter 91 adjusts its output power according to a feedback voltage Vfb from the converter output power controller 92 and then delivers the adjusted output power to power amplifier 30.

The converter output power controller 92 comprises: voltage dividing resistors R1, R2, R3, R4 serially connected between the output terminal of the DC-to-DC converter 91 and ground; a first NPN transistor TR1 having a collector, emitter and base terminal with the collector terminal being connected between resistors R1 and R2, the emitter terminal being connected to the output terminal of DC-to-DC converter 91, and the base terminal being connected to the control unit 40, whereby the first transistor TR1 is operated under the control of the control unit 40; and a second NPN transistor TR2 having a collector, emitter and base terminal with the collector terminal being connected between resistors R2 and R3, the emitter terminal being connected to the output terminal of the DC-to-DC converter 91, and the base terminal being connected to the control unit 40, whereby the second transistor TR2 is operated under the control of the control unit 40.

A power controlling procedure of the present invention is described in detail with reference to FIGS. 2 and 4, with FIG. 4 being a flow chart illustrating a power controlling procedure based on a detected RSSI value according to an embodiment of the present invention. When a line is busy (step 100), the RSSI detector 50 detects the RSSI value (step 110) and then transfers the detected RSSI value to control unit 40. The control unit 40 then determines whether the detected RSSI value is stronger than a first reference strength (step 120), which is a fixed reference value that is stored in the memory of control unit 40 to control the power amplification of power amplifier 30. Therefore, if the detected RSSI value is greater than the first reference value, the control unit 40 assumes that the unit is operating in a strong electric field region. On the other hand, if the detected RSSI value is less than the first reference value, then the control unit 40 assumes that the unit is operating in a weak electric field region. In either situation, to be further explained below, the control unit 40 respectively signals the power supply controller 90 to adjust the power supplied to the power amplifier 30.

By way of example, if a detected RSSI value is −80 dBm in the CDMA mode, the transmission output level that is required to enable communication with a base station is usually about 7 dBm of transmitted power, which requires about 4 V to be applied to the power amplifier 30 to amplify the transmitting signals accordingly. On the other hand, if the detected RSSI value is −90 dBm in the CDMA mode, the transmission output level needed to establish communication with the base station must be set to about 17 dBm of transmitted power, which requires 5 V to be applied to the power amplifier 30 to amplify the transmitting signals accordingly. Therefore, if a first reference strength is set in accordance with the RSSI value of −80 dBm in the above example, an amount of power corresponding to the 1 V difference can be saved when the unit operates in a region of high electric field intensity.

Figure 4:
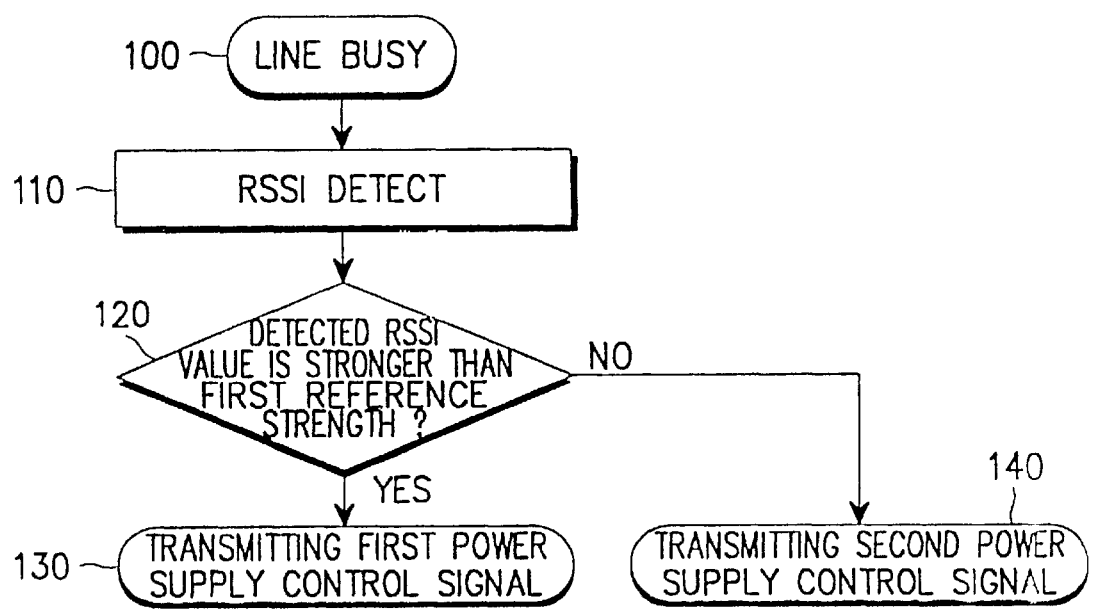
FIG. 4 is a flow chart illustrating a power controlling procedure based on a detected RSSI according to an embodiment of the present invention.

Referring now back to FIGS. 2 and 4, when the detected RSSI value appears to be stronger than the first reference strength (step 120), the control unit 40 transmits a first power supply control signal to power supply controller 90 (step 130). At this time, referring to FIG. 3, the power supply controller 90 operates as follows. After receiving the first power supply control signal from control unit 40, the second transistor TR2 is turned on, and the voltage division is performed only by resistors R3, R4, thereby forming a feedback voltage Vfb which then causes the DC-to-DC converter 91 to adjust the output voltage to be applied to the power amplifier 30. In this situation, the output voltage is adjusted to about 4 V and can be adjusted differently if necessary.

When the detected RSSI value appears to be less than the first reference strength (step 120), the control unit 40 transmits a second power supply control signal to power supply controller 90 (step 140). At this time, the power supply controller 90 operates as follows. After receiving the second power supply control signal from control unit 40, the second transistor TR2 is turned off, whereby the feedback voltage Vfb is formed by all four voltage dividing resistors R1, R2, R3, and R4, which then causes the DC-to-DC converter 91 to adjust the output voltage to be applied to the power amplifier 30. In the this situation, the output voltage is adjusted to about 5 V and, again, can be adjusted differently if necessary.

A power controlling procedure based on the modes set by a dual mode method according to an embodiment of the present invention is described in detail with reference to FIGS. 2, 3 and 5. In order to select the desired mode (e.g., FM mode) among the dual modes, the user presses the appropriate keys on the key pad 80. After receiving an FM mode setting signal (step 200), the control unit 40 transmits a third power supply control signal to power supply controller 90 (step 210). The power supply controller 90 then operates as follows. After receiving the third power supply control signal from control unit 40, the first transistor TR1 is turned on, whereby the feedback voltage Vfb is formed by only three voltage dividing resistors R2, R3, R4, which then causes the DC-to-DC converter 91 to adjust the output voltage to be applied to the power amplifier 30. In this situation, the output voltage is adjusted to 4.7 V and can be adjusted differently if necessary.

When the user chooses the CDMA mode on the key pad 80, the control unit 40 receives a CDMA mode setting signal (step 220), and then transmits a fourth power supply control signal to power supply controller 90 (step 230). The power supply controller 90 then operates as follows. After receiving the fourth power supply control signal, the first transistor TR1 is turned off, whereby the feedback voltage Vfb is formed by all of four voltage dividing resistors R1, R2, R3, R4, which causes the DC-to-DC converter 91 to adjust the output voltage to be applied to the power amplifier 30. In this situation, the output voltage is adjusted to 5 V and can be adjusted differently if necessary.

Next, if the user chooses an automatic mode on the key pad 80, the control unit 40 receives an automatic mode setting signal (step 240) and proceeds to detect the RSSI value of the CDMA mode through the RSSI detector 50 (step 250). Thereafter, the control unit 40 determines whether the detected RSSI value of the CDMA mode is stronger than a second reference strength (step 260). The second reference strength is a reference value stored in memory which is set according to the region of a very weak electric field strength in which the CDMA method can not communicate with the base station. If the detected RSSI value appears to be greater than the second reference strength, the CDMA mode is chosen, and the control unit 40 provides the fourth power supply control signal (step 230) to the base terminal of the first transistor TR1 of the power supply controller 90.

If, on the other hand, the detected RSSI value appears to be less than the second reference strength, the FM mode is chosen, and the control unit 40 provides the third power supply control signal (step 210) to the base terminal of the first transistor TR1 of the power supply controller 90. The following table shows a summary of the operations of the circuit depicted in FIG. 3.

TABLE 1

| | | Con-troller | Converter Output Controller | | | DC-DC Conv. |
|---|---|---|---|---|---|---|
| Class | | Output | TR OPR. | | Voltage Div. R. | Output |
| RSSI | SEF | 1 PSCS | TR2 | ON | R3, R4 | 4V |
| | WEF | 2 PSCS | | OFF | R1, R2, R3, R4 | 5V |
| Mode | FM | 3 PSCS | TR1 | ON | R2, R3, R4 | 4.7V |
| | CDMA | 4 PSCS | | OFF | R1, R2, R3, R4 | 5V |

In Table 1, SEF represents Strong Electric Field, WEF represents Weak Electric Field, PSCS represents Power Supply Control Signal, TR OPR. represents Transistor Operation, Voltage Div. R. represents Voltage Dividing Resistor, and DC-DC Conv. represents the DC-to-DC Converter.

Figure 6:
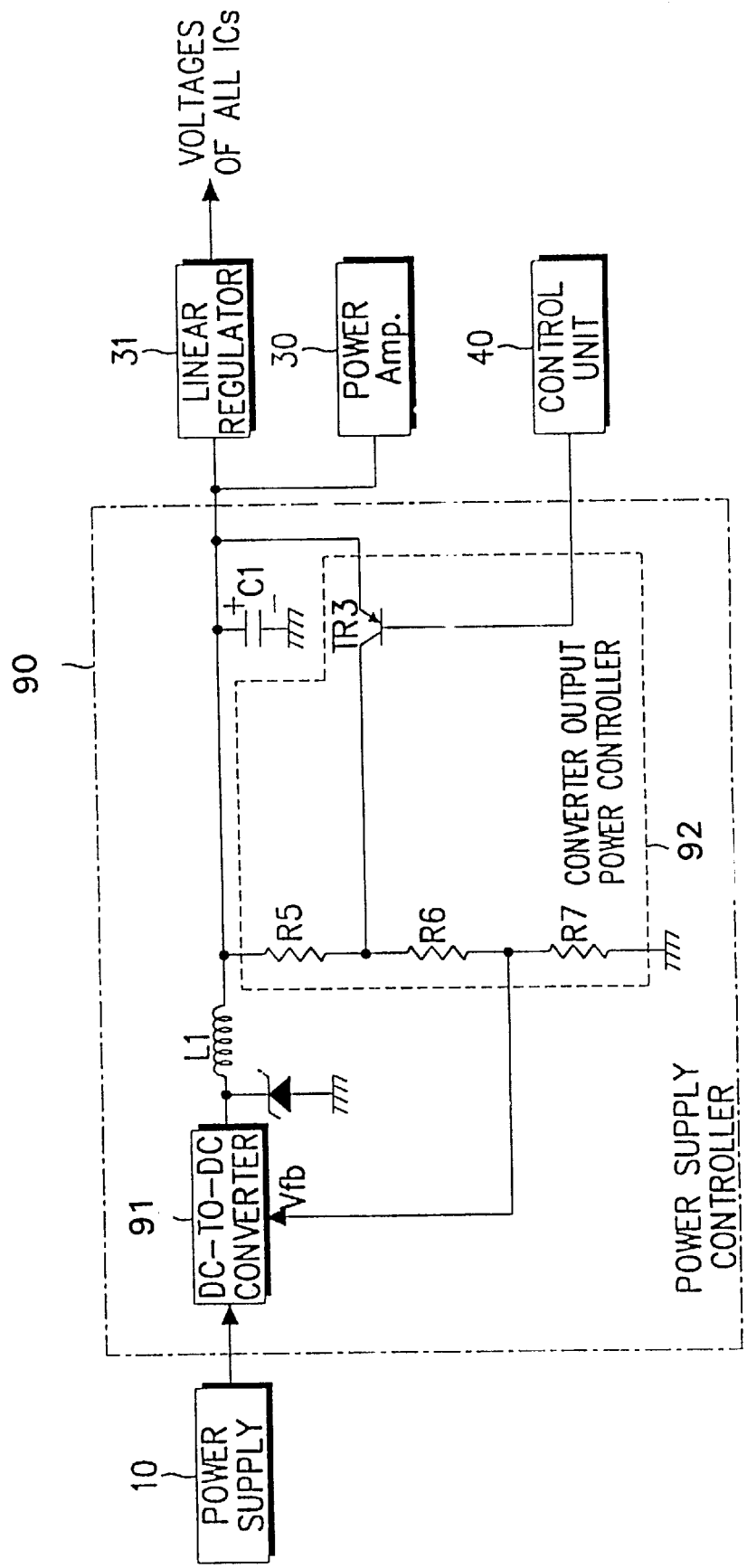
FIG. 6 is a power controlling circuit of a dual mode portable radiotelephone according to another embodiment of the present invention.

Referring now to FIG. 6, a power controlling circuit of a dual mode portable radiotelephone according to another embodiment of the present invention is shown. The constituent elements of FIG. 6 are the same as those of FIG. 3, except that the converter output power controller 92 is comprised of voltage dividing resistors R5, R6 and R7, and a third NPN transistor TR3 having a collector terminal connected between resistors R5 and R6, an emitter terminal connected to the output terminal of DC-to-DC converter 91, and a base terminal connected to control unit 40 which controls the operation of third transistor TR3. The three voltage dividing resistors R5, R6, R7 are serially connected between the output terminal of the DC-to-DC converter 91 and the ground terminal. The feedback voltage line of the DC-to-DC converter 91 is connected between the resistors R6 and R7.

Figure 5:
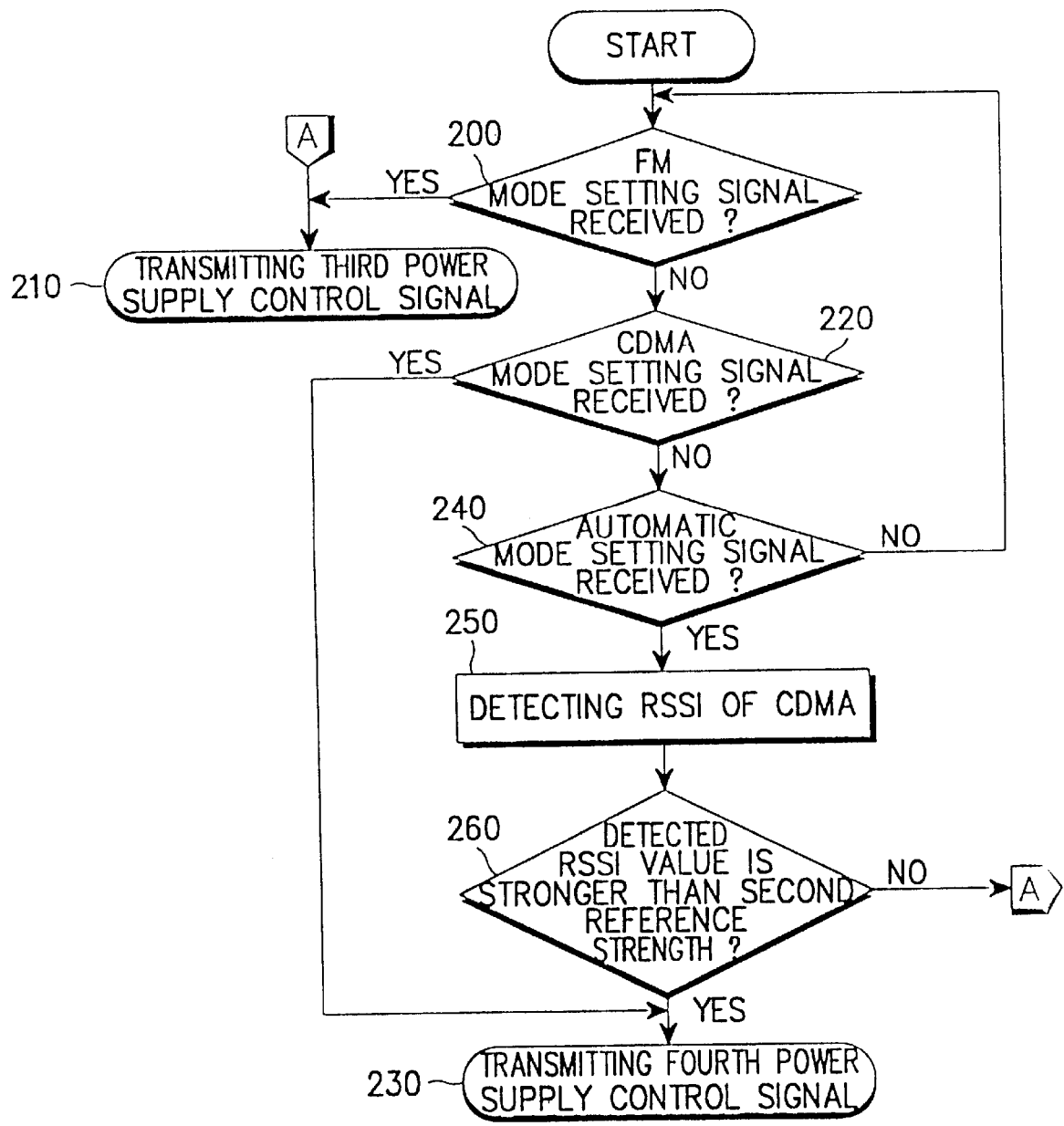
FIG. 5 is a flow chart illustrating a power controlling procedure based on modes set by a dual mode method according to an embodiment of the present invention.

Thus, in this particular embodiment, either method of FIG. 4 or method of FIG. 5 is performed, rather than combined operation as in FIG. 3. Further, the voltage dividing resistors must be reset in conformity to the output voltage. For example, when the CDMA mode is set, or when it is required to increase the transmitting output level, the third transistor TR3 is turned off by the control unit 40 so that the DC-to-DC converter 91 can supply a voltage level of 5 V. Accordingly, the resistors R5, R6 and R7, which generate the feedback voltage, must be appropriately set. To the contrary, when the FM mode is set, or when it is required to decrease the transmitting output level, the third transistor TR3 is turned on by the control unit 40 so that the DC-to-DC converter 91 can supply a voltage level of 4.7 V or 4 V. Accordingly, the voltage division generating feedback voltage is performed by the resistors R6 and R7 and, therefore, the resistor R7 must be appropriately set.

Figure 7:
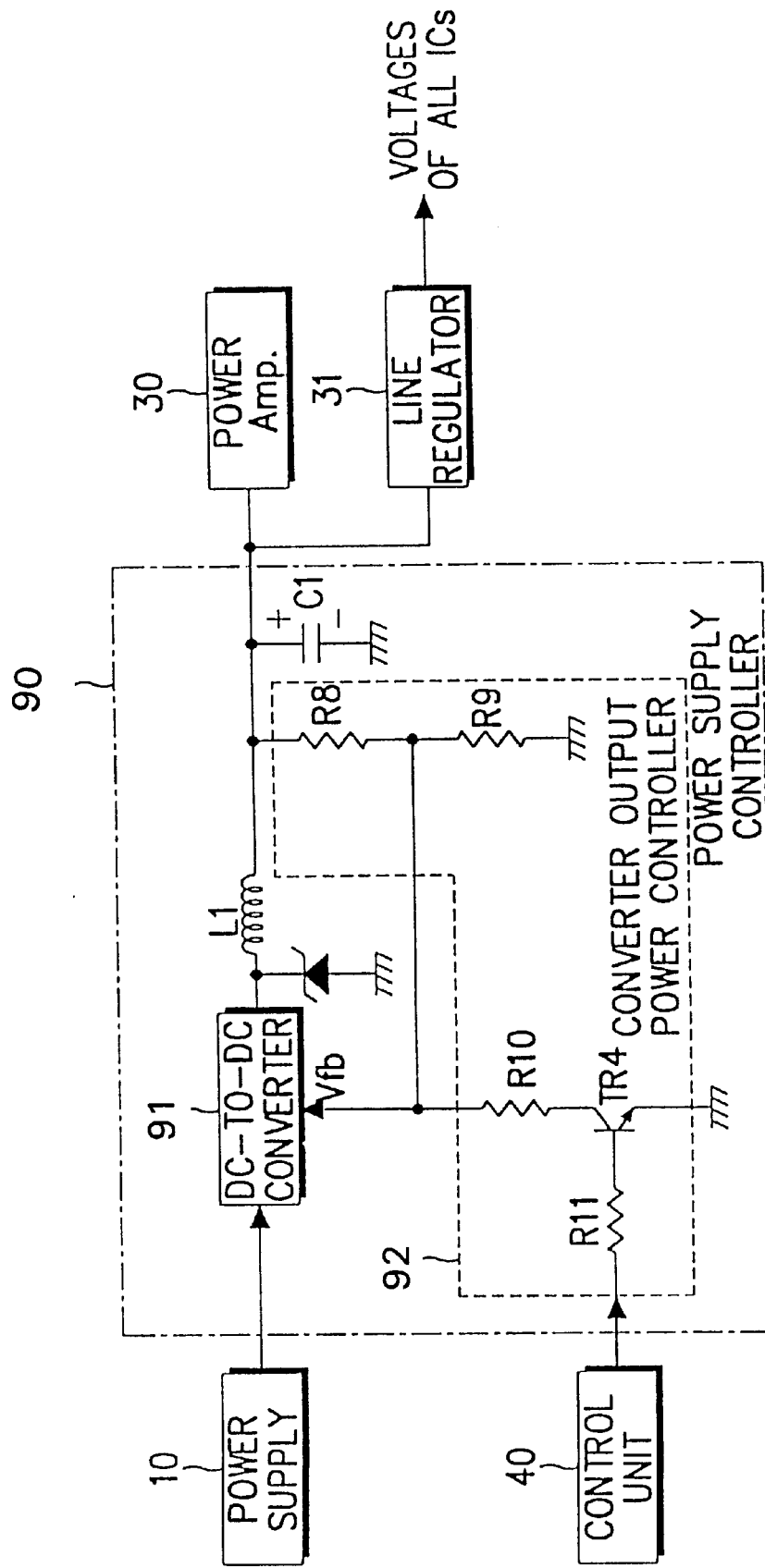
FIG. 7 is a power controlling circuit of a dual mode portable radiotelephone according to yet another embodiment of the present invention.

FIG. 7 is a power controlling circuit of a dual mode portable radiotelephone according to a further embodiment of the present invention. This embodiment comprises a converter output power controller 92 comprising three voltage dividing resistors R8, R9 and R10, and a fourth PNP transistor TR4 having a collector terminal connected to the feedback voltage line Vfb, an emitter terminal connected to ground, and a base terminal connected through resistor R11 to the control unit 40, whereby the above fourth transistor TR4 is operated (turned on and off) under the control of the control unit 40 so as to adjust the feedback voltage. The resistors R8 and R9 are serially connected between the output terminal of DC-to-DC converter 91 and the ground terminal, and the resistor R10 is connected between the feedback voltage line and the collector of the fourth transistor TR4. The feedback voltage line is connected between resistors R8 and R9 on the one end, and with the contact between DC-to-DC converter 91 and resistor R10 on the other end.

Also with an embodiment as shown in FIG. 7, either the method of FIG. 4 or the method of FIG. 5 is performed, rather than the combined operation as in FIG. 3., since the voltage dividing resistors R8, R9 and R10 must be reset in conformity to the output voltage. For example, when the CDMA mode is set, or when it is required to increase the transmitting output level, the control unit 40 turns off the fourth transistor TR4 so that the DC-to-DC converter 91 can supply a voltage level of 5 V. Accordingly, the resistors R8 and R9, which generate a feedback voltage, must be appropriately set. To the contrary, when the FM mode is set, or when it is required to decrease the transmitting output level, the third transistor TR3 is turned on by the control unit 40 so that the DC-to-DC converter 91 can supply a voltage level of 4.7 V or 4 V. Accordingly, the voltage division is performed by the resistors R8, R9 and R10. Therefore, the above tenth resistor R10 must be appropriately set.

In the above description, although embodiments of the present invention have been described in detail with reference to specific voltage values such as 5 V, 4.7 V, 4 V, this is not to be construed as a limitation of the present invention itself. It is to be appreciated by one skilled in the art that the present invention can employ any voltage level that may be required for different power amplifiers. It is to be further appreciated that the present invention can be applied to all the above-mentioned dual band methods, notwithstanding that a dual mode radiotelephone terminal adopting FM as first mode and CDMA as second mode was described herein.

The present invention is advantageous in that, since portable radiotelephones are operated, for the most part, in a region of a strong electric field intensity thereby requiring less power transmission levels, the power consumption of such portable radiotelephones can be reduced by controlling the power used by the power amplifier in generating transmission signals. This results in prolonging the battery life, mitigating the adverse thermal effects on the circuitry caused by continuous high power operation, and improving the efficiency of the power amplifier.

Although illustrative embodiments of the present invention have been described herein with reference to the accompanying drawings having specific constituent elements for the purpose of allowing those skilled in the art to better understand the present invention, it is to be understood that the invention is not limited to those precise embodiments, and that various other changes and modifications may be effected therein by one skilled in the art without departing from the true scope and spirit of the invention.

What is claimed is:

1. A circuit for controlling power associated with a power amplifier in a portable radiotelephone having a first communication mode and a second communication mode, the circuit comprising:

means for supplying power to said circuit;

a power supply controller, responsive to said power supplying means and operatively coupled to said power amplifier, for adjusting said power supplied from said power supplying means and delivering said adjusted power to said power amplifier; and a control unit, operatively coupled to said power supply controller, outputting one of a plurality of control signals for controlling voltage levels provided by said power supply controller, each of said power control signals corresponding to one of said first communication mode, said second communication mode, a strong electric field, and a weak electric field.

2. The circuit according to claim 1, wherein said first communication mode is FM mode, and said second communication mode is CDMA mode.

3. The circuit according to claim 1, wherein said power supply controller comprises:

a DC-to-DC converter for adjusting a voltage of said power supplying means, said DC-to-DC converter having an input terminal connected to said power supplying means for receiving said voltage, an output terminal connected to said power amplifier for supplying said power amplifier with an adjusted voltage, and a voltage feedback input terminal; and a converter output power controller, connected to said output terminal and said voltage feedback terminal of said DC-to-DC converter and which is responsive to said control unit, the converter output power controller controlling said adjusted voltage of said DC-to-DC converter in response to control signals provided by said control unit.

4. The circuit according to claim 3, wherein said converter output power controller comprises:

a first, second and third resistor, serially connected between the output terminal of said DC-to-DC converter and ground, for dividing said voltage present on said output terminal of said DC-to-DC converter to generate a feedback voltage, wherein said feedback voltage is applied to said DC-to-DC converter through said voltage feedback terminal for said DC-to-DC converter to generate said adjusted voltage; and an NPN transistor having a collector terminal, an emitter terminal and a base terminal, said collector terminal being connected to a junction between said first resistor and said second resistor, said emitter terminal being connected to said ground, and said base terminal being connected to said control unit, wherein said transistor is responsive to control signals from said control unit so as to control the voltage division of said resistors, thereby adjusting said feedback voltage provided to said DC-to-DC converter.

5. The circuit according to claim 4, wherein said control unit turns on said transistor during said first mode, and turns off said transistor during said second mode.

6. The circuit according to claim 3, wherein said converter output power controller comprises:

a PNP transistor having a collector terminal, an emitter terminal connected to said ground, and a base terminal;

a first and second voltage dividing resistor, serially connected between said output terminal of said DC-to-DC converter and said ground;

a third voltage dividing resistor, connected between said collector terminal of said PNP transistor and a junction between said first and second voltage dividing resistors and said feedback voltage terminal of said DC-to-DC converter;

a fourth resistor connected between said base terminal of said PNP transistor and said control unit, wherein said transistor is turned on and off by control signals from said control unit to said base terminal for controlling voltage division of said output voltage of said DC-to-DC converter by said first resistor, said second resistor and said third voltage dividing resistor, and adjusting feedback voltage provided to said DC-to-DC converter.

7. The circuit according to claim 6, wherein said control unit turns on said transistor during said first mode, and wherein said control unit turns off said transistor during said second mode.

8. A circuit for controlling power generated by a power amplifier in a portable radiotelephone, the circuit comprising:

means for supplying power to said circuit;

a power supply controller, responsive to said power supplying means and operatively coupled to said power amplifier, for adjusting said power supplied from said power supplying means and delivering said adjusted power to said power amplifier; and a control unit, operatively coupled to said power supply controller, for controlling voltage levels provided by said power supply controller according to one of a strong electric field region and a weak electric field region.

9. The circuit according to claim 8, wherein said power supply controller comprises:

a DC-to-DC converter for adjusting a voltage of said power supplying means, said DC-to-DC converter having an input terminal connected to said power supplying means for receiving said voltage, an output terminal connected to said power amplifier for supplying said power amplifier with an adjusted voltage, and a voltage feedback input terminal; and a converter output power controller, connected to said output terminal and said voltage feedback terminal of said DC-to-DC converter and which is responsive to said control unit, the converter output power controller controlling said adjusted voltage of said DC-to-DC converter in response to control signals provided by said control unit.

10. The circuit according to claim 9, wherein said converter output power controller comprises:

a first, second and third resistor, serially connected between the output terminal of said DC-to-DC converter and ground, for dividing said voltage present on said output terminal of said DC-to-DC converter to generate a feedback voltage, wherein said feedback voltage is applied to said DC-to-DC converter through said voltage feedback terminal for said DC-to-DC converter to generate said adjusted voltage; and an NPN transistor having a collector terminal, an emitter terminal and a base terminal, said collector terminal being connected to a junction between said first resistor and said second resistor, said emitter terminal being connected to said ground, and said base terminal being connected to said control unit, wherein said transistor is responsive to control signals from said control unit so as to control the voltage division of said resistors, thereby adjusting said feedback voltage provided to said DC-to-DC converter.

11. The circuit according to claim 10, wherein said control unit turns on said transistor in said strong electric field region, and turns off said transistor in said weak electric field region.

12. The circuit according to claim 9, wherein said converter output power controller comprises:

a PNP transistor having a collector terminal, an emitter terminal connected to said ground, and a base terminal;

a first and second voltage dividing resistor, serially connected between said output terminal of said DC-to-DC converter and said ground;

a third voltage dividing resistor, connected between said collector terminal of said PNP transistor and a junction between said first and second voltage dividing resistors and said feedback voltage terminal of said DC-to-DC converter;

a fourth resistor connected between said base terminal of said PNP transistor and said control unit, wherein said transistor is turned on and off by control signals from said control unit to said base terminal for controlling voltage division of said output voltage of said DC-to-DC converter by said first resistor, said second resistor and said third voltage dividing resistor, and adjusting feedback voltage provided to said DC-to-DC converter.

13. The circuit according to claim 12, wherein said control unit turns on said transistor in said strong electric field region, and said control unit turns off said transistor in said weak electric field region.

14. A circuit for controlling power associated with a power amplifier in a portable radiotelephone having a first operating mode and a second operating mode, the circuit comprising:

means for supplying power to said circuit;

a power supply controller, responsive to said power supplying means and operatively coupled to said power amplifier, for adjusting said power supplied from said power supplying means and delivering said adjusted power to said power amplifier; and a control unit, operatively coupled to said power supply controller, for controlling said adjusted power of said power supply controller according to one of said modes and electric field intensities including a strong electric field intensity and a weak electric field intensity.

15. The circuit according to claim 14, wherein said power supply controller comprises:

a DC-to-DC converter for adjusting a voltage of said power supplying means, said DC-to-DC converter having a an input terminal connected to said power supplying means for receiving said voltage, an output terminal connected to said power amplifier for supplying said power amplifier with an adjusted voltage, and a voltage feedback input terminal; and a converter output power controller, connected to said output terminal and said voltage feedback terminal of said DC-to-DC converter and which is responsive to said control unit, the converter output power controller controlling said adjusted voltage of said DC-to-DC converter in response to control signals provided by said control unit.

16. The circuit according to claim 15, wherein said converter output power controller comprises:

a first, second, third and fourth voltage dividing resistor, serially connected between the output terminal of said DC-to-DC converter and ground, for dividing said voltage present on said output terminal of said DC-to-DC converter to generate a feedback voltage, wherein said feedback voltage is applied to said DC-to-DC converter through said voltage feedback terminal for said DC-to-DC converter to generate said adjusted voltage; and a first NPN transistor having a collector terminal, an emitter terminal and a base terminal, said collector terminal being connected to a junction between said first resistor and said second resistor, said emitter terminal being connected to said ground, and said base terminal being connected to said control unit, wherein said first NPN transistor is turned on and off by a third power supply control signal and a fourth power supply control signal from said control unit so as to control the voltage division of said resistors, thereby adjusting feedback voltage provided to said DC-to-DC converter; and a second NPN transistor having a collector terminal, an emitter terminal and a base terminal, said collector terminal of said second transistor being connected to a junction between said second resistor and said third resistor, said emitter terminal of said second NPN transistor being connected to said ground, and said base terminal of said second NPN transistor being connected to said control unit, wherein said second NPN transistor is turned on and off by a first power supply control signal and a second power supply control signal from said control unit so as to control the voltage division of said resistors, thereby adjusting feedback voltage for said DC-to-DC converter.

17. The circuit according to claim 16, wherein said first power supply control signal turns on said second transistor so as to control said output voltage of said DC-to-DC converter in said strong electric field region;

said second power supply control signal turns off said second transistor so as to control said output voltage of said DC-to-DC converter in said weak electric field region;

said third power supply control signal turns on said first transistor so as to control said output voltage of said DC-to-DC converter during said first mode; and said fourth power supply control signal turns off said first transistor so as to control said output voltage of said DC-to-DC converter during said second mode.

18. A method for controlling power used by a portable radiotelephone having a first and second mode of operation and wherein said portable radiotelephone includes means for supplying power and a power amplifier, said method comprising the steps of:

selecting between said first mode of operation, said second mode of operation, and electric field intensities including a strong electric field intensity and a weak electric field intensity;

providing a first mode setting signal for said selected first mode;

providing a second mode setting signal for said selected second mode;

providing a third mode setting signal for said strong electric field intensity;

providing a fourth mode setting signal for said weak field electric field intensity;

controlling power supplied to said power amplifier in response to said first mode setting signal so as to supply necessary power for said first mode of operation; and controlling power supplied to said power amplifier in response to said second mode setting signal so as to supply necessary power for said second mode of operation, controlling power supplied to said power amplifier in response to said third mode setting signal so as to supply necessary power for said third mode of operation, controlling power supplied to said power amplifier in response to said fourth mode setting signal so as to supply necessary power for said fourth mode of operation.

19. The method for controlling power according to claim 18, wherein said first communication mode is an FM mode, and said second communication mode is a CDMA mode.

20. A method for controlling power according to claim 19, further comprising the steps:

selecting an automatic mode of operation;

detecting a receiving electric field strength of CDMA mode;

controlling power supplied to said power amplifier when said detected receiving electric field strength is stronger than a second reference strength; and controlling power supplied to said power amplifier when said detected receiving electric field strength is weaker than said second reference strength.

21. A method for controlling power used by a portable radiotelephone having a first and second mode of operation, and wherein said radiotelephone terminal includes means for supplying power and a power amplifier, said method comprising the steps:

detecting a receiving electric field strength while said radiotelephone is operating;

comparing said detected receiving electric field strength with a first reference strength;

adjusting power supplied to said power amplifier when said detected receiving electric field strength is stronger than said first reference strength; and adjusting power supplied to said power amplifier when said detected receiving electric field strength is weaker than said first reference strength.

* * * * *